United States Patent [19]
Erbstein

[11] 3,851,168
[45] Nov. 26, 1974

[54] OBJECT SENSING APPARATUS

[75] Inventor: Robert S. Erbstein, Coventry, R.I.

[73] Assignee: Leesona Corporation, Warwick, R.I.

[22] Filed: Aug. 23, 1973

[21] Appl. No.: 391,156

[52] U.S. Cl. ............................. 250/221, 317/124
[51] Int. Cl. ................................... H01j 39/12
[58] Field of Search ........... 250/221, 222; 317/124, 340/258 B

[56] References Cited
UNITED STATES PATENTS

| | | | |
|---|---|---|---|
| 2,495,249 | 1/1950 | Gilbert | 250/221 |
| 2,708,715 | 5/1955 | Meyers | 317/124 |
| 2,946,931 | 7/1960 | Durbin | 317/124 |
| 3,138,357 | 6/1964 | Whitwell | 317/124 |
| 3,328,592 | 6/1967 | Shaw | 317/124 |
| 3,596,103 | 7/1971 | Matthews | 250/222 |
| 3,605,082 | 9/1971 | Matthews | 340/258 B |
| 3,670,167 | 6/1972 | Forbes | 250/221 |
| 3,719,938 | 3/1973 | Perlman | 250/221 |
| 3,746,863 | 7/1973 | Pronovost | 340/258 B |

*Primary Examiner*—Archie R. Borchelt
*Assistant Examiner*—D. C. Nelms
*Attorney, Agent, or Firm*—Albert P. Davis; Burnett W. Norton

[57] ABSTRACT

Apparatus for sensing the presence of an object, such as a machine operator, in the path of 1 travelling tender is disclosed. The tender is movable by drive means relative to a strand processing machine and incorporates a source of electrical energy and means in circuit with the electrical energy source to provide a modulated output signal. Radiant energy emitting means are provided for receiving the signal and providing a radiation output proportional to the signal. Radiation sensitive means for receiving the output from the emitting source and transmitting a control signal in response thereto is also included. The control signal is measured by a comparator and gating means are connected with the comparator, the gating means being in a normally non-conductive state. The gating means is switched to a conductive state to program the tender drive means to a zero speed state to program the tender drive means to a zero speed state when the amplitude of the control signal drops below a predetermined value such as, for example, when the operator interrupts the output signal from the output signal producing means. In consequence thereof the travelling tender is halted without injury to the operator.

9 Claims, 7 Drawing Figures

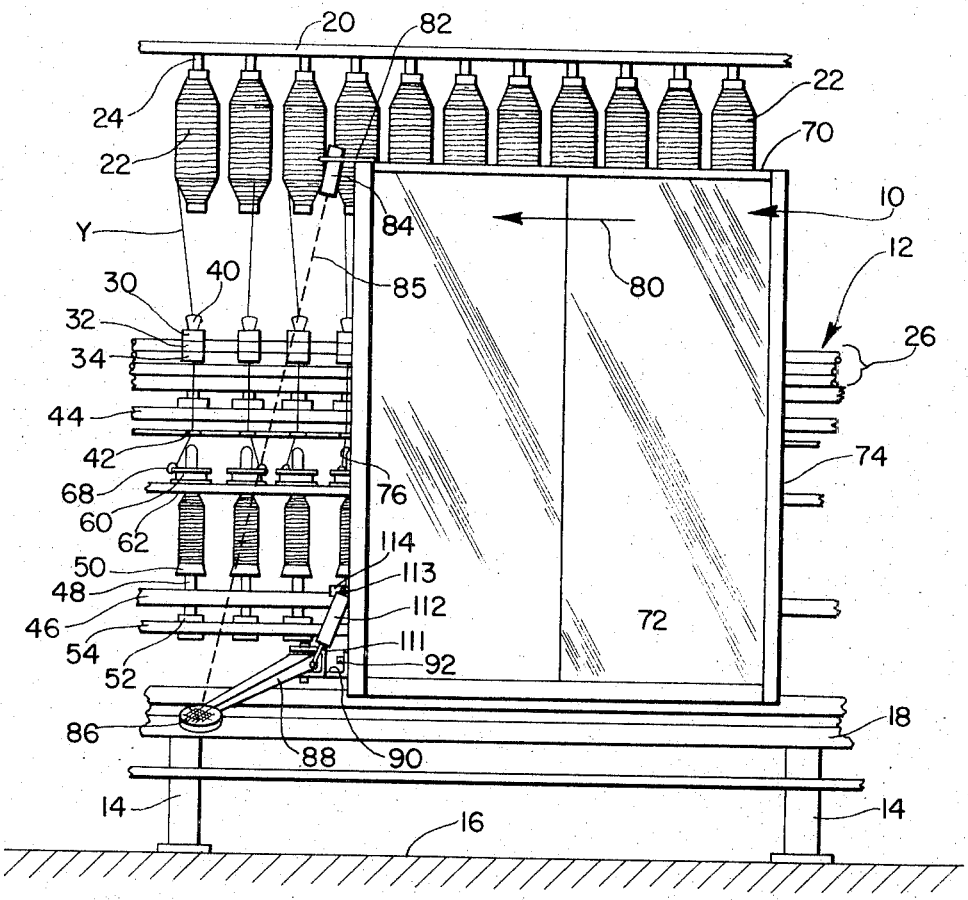
FIG. 1
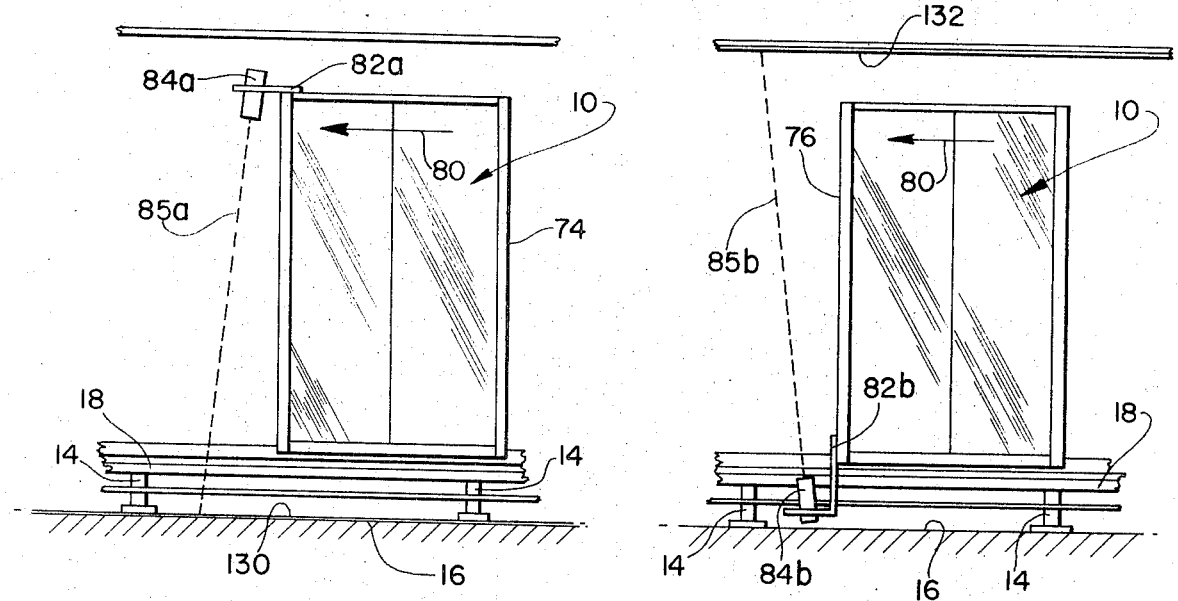
FIG. 3
FIG. 4

OBJECT SENSING APPARATUS

BACKGROUND OF THE INVENTION

The present invention relates to a control device for an automatically movable mechanism and relates, more particularly, to apparatus for sensing the presence of an object in the path of a travelling tender and halting the progress of the tender in response to such sensing.

In U.S. Pat. No. 3,403,866 issued Oct. 1, 1968 to Charles C. Bell et al, there is disclosed a travelling tender which is automatically operable to doff and donn bobbins on a textile spinning frame and for rejoining breaks occurring in the strand of yarn. The tender is mounted on the textile spinning frame and is driven by suitable power means to patrol all of the spinning positions on at least a given section of the frame and service any spinning positions therealong requiring attention.

While the tender of the prior cited patent functions admirably in achieving the automatic tending of a textile spinning frame, nevertheless, it has become desirable to provide the tender with a sensing means which will stop it without serious injury to a person, such as a machine operator, who may be in the path of the tender and unable to move or unaware of the fact that the tender is bearing down on her.

SUMMARY OF THE INVENTION

Halting of the tender is achieved in accordance with the present invention by directing a beam of light energy onto a retro-reflective target in a manner such that the beam is interrupted by a person or other object situated in the path of movement of the tender. The beam of light is directed in a path to scan a zone immediately ahead of the path of movement of the tender and, if an object such as a person is in the zone, the beam of light is broken by the person, resulting in the drive motor of the tender being stopped. The beam of light energy may be emitted from a source carried at either the upper end or lower end of the tender. The retro-reflective target may be carried at a spaced apart location at the opposite end of the tender from the light source or, alternatively, at a position above or below said tender and remote therefrom. Further, if the retro-reflective target is located at the lower end of the tender it is desirable that this target be provided with means to permit the target to yield in the event that it comes in contact with an object in the path of the moving tender. In this manner the object, if it be a person, will not be injured by being physically contacted by the target. As a practical matter, physical contact of the operator by the target will displace the target from the path of the light beam, thus disabling the drive for the carriage.

In keeping with the foregoing it is one object of the present invention to provide apparatus for halting the movement of a travelling tender when an object is in the path of movement of the tender.

A further object of the present invention is to provide apparatus including a source of radiant energy and radiation receiving means operable to scan a zone in the path of movement of a travelling tender and halt further movement of the tender when said zone is occupied by an object.

An additional object of the present invention is to provide apparatus for halting the movement of a travelling tender when its path is impeded by an object, which said apparatus is durable and has a high degree of reliability in use.

Other objects of the invention will be obvious or will become apparent by reading of the specification which follows taken in connection with the accompanying drawings.

BRIEF DESCRIPTION OF THE DRAWING

FIG. 1 is a front elevational view of a textile spinning frame provided with automatic tending mechanism therefor and incorporating the present invention;

FIGS. 3, 4 and 5 are front elevational views similar to FIG. 1 illustrating modified embodiments of the sensing apparatus of FIG. 1, with details of the textile spinning frame omitted;

DESCRIPTION OF THE PREFERRED EMBODIMENT

Figure 2:
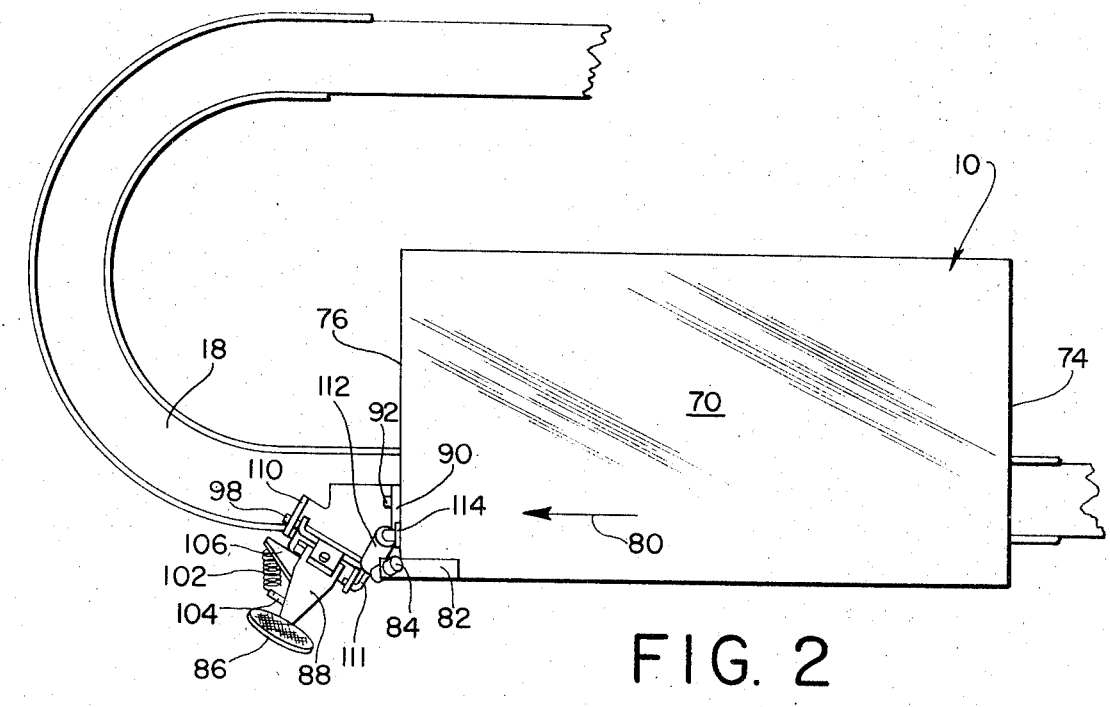
FIG. 2 is a top plan view of the structure of FIG. 1 with portions of the spinning frame omitted for clarity.

Turning firstly to detailed consideration of FIGS. 1 and 2, automatic tending mechanism 10 such as that fully described in the afore-mentioned U.S. Pat. No. 3,403,866 is mounted on a textile spinning frame identified generally by the numeral 12. The construction and operation of the tender 10 and the conventional spinning frame 12 which provides the context in which the improvement of the present invention occurs requires no detailed description herein. Therefore, only enough of the parts of the tender 10 and conventional frame 12 appear in the drawings as are necessary to convey the manner in which the present invention is associated with the tender and frame. Thus, in FIG. 1 it is seen that frame 12 includes a series of legs 14 which support the tender from floor 16. Frame 12 is suitably braced by a plurality of horizontally extending crossbars such as that illustrated at 18 and by frame ends not herein illustrated.

At the top of frame 12 is a roving bobbin creel 20 which supports a plurality of supply bobbins 22 of the roving in any suitable way as by means, for example, of a bracket 24 engaging in each supply bobbin 22. The roving Y extends from each bobbin 22 downwardly to a respective drafting section of the frame which is supported on the draft rail 26. This section includes suitable roll stands for supporting in opposed relationship a plurality of pairs of drafting rolls 30, 32 and 34, the respective pairs being driven at a predetermined ratio increasing from rear to front so as to progressively elongate an associated strand of roving directed thereto via a trumpet guide 40. From the nip of the front or delivery pair of draft rolls 34 the now attenuated strand from each set of drafting rolls passes through an associated guide eye 42 mounted on the front of rail 44.

Arranged below each guide 42 is the spindle rail 46 on which are journalled a plurality of spindles 48 for holding the take-up bobbins 50 on which the spun yarn from each set of drafting rolls is wound to form a take-up package. Just below the journal of rail 46 each of the spindles 48 is provided with a whorl 52 which is engaged by a flexible driving belt 54 in order to rotate the spindles and bobbins.

In order to guide each strand Y to its respective take-up bobbin 50 each of the spindles 48 is encircled by a ring 60 carried on a ring rail 62 extending lengthwise of frame 12 parallel to spindle rail 46. A traveller 68 rides on the upper flange of each ring 60 in engagement with the strand to hold the strand clear of the bobbin periphery. Distribution of the yarn along the length of the take-up bobbin 50 to form a satisfactory package is effected by reciprocation of the ring rail vertically via lift rods (not shown) as each of the bobbins is rotated by common driving belt 54.

Up to this point the description has been confined to the conventional pinning frame which, except as serving as a context for the present invention, forms no part of it. Similarly, the tender 10 which, as shown in FIG. 1, is mounted on the spinning frame for patrolling motion therealong also serves simply as a portion of the context for the present invention and otherwise forms no part of it. Therefore, except where deemed necessary to a full understanding of the present invention, further details of the spinning frame and tender are not included herein.

With continuing reference to FIGS. 1 and 2 tender 10 is constituted as a generally box-like unit which includes a top wall 70, a lower wall 72 and opposing side walls 74 and 76. Presuming that tender 10 is driven in the direction of the arrow 80, wall 76 may be regarded as the forward wall and wall 74 as the trailing wall of tender 10. The tender 10 is carried on wheels (not illustrated herein) which ride on rail or cross-bar 18. As best seen in FIG. 2 cross-bar 18 makes a loop around each end of frame 12, thus permitting tender 10 to be driven around the frame in a continuous direction to permit servicing of the spindles typically arranged along each side of the frame.

As is shown in FIGS. 1 and 2 a bracket 82 is affixed to the top wall 70 of tender 10 at the juncture where this top wall joins with forward wall 76. Bracket 82 serves as a mount for a photo-electric unit 84. This photo-electric unit 84 is aimed to emit a beam of light 85 in a path forward of forward wall 76, say at an angle of approximately 15°, this beam thus scanning the path immediately ahead of tender 10 as the tender is driven in the direction of arrow 80.

For purposes of reflecting the beam of light emitted from photo-electric unit 84 a reflector 86 is mounted on a pivotable wand or arm 88 which, in turn, is supported on a bracket 90 secured on forward wall 76 of tender 10 by means of bolts 92. Reflector 86 thus provides a target for the light source within photo-electric unit 84 and returns the beam as reflected light to a receiver also positioned within photo-electric unit 84.

Figure 6:
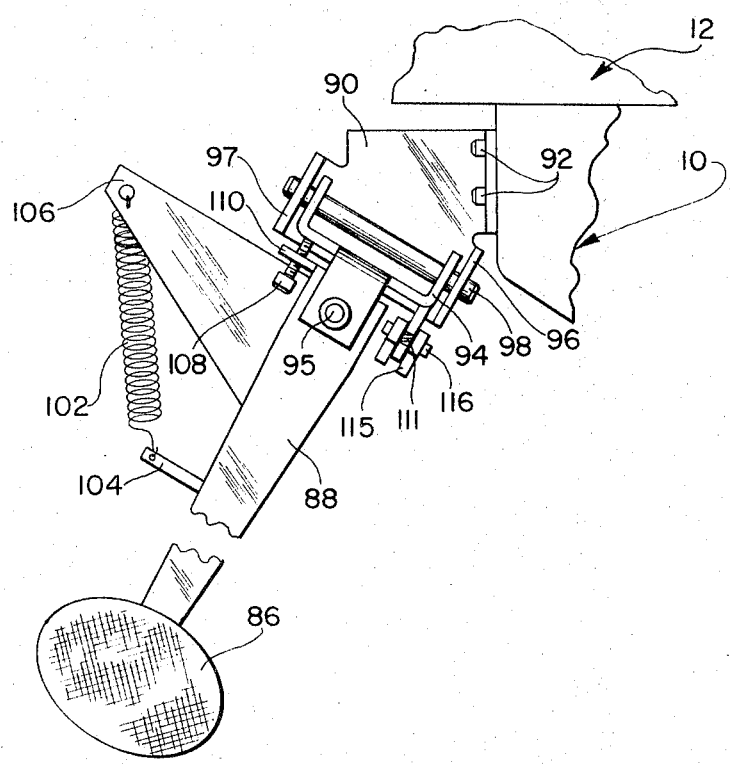
FIG. 6 is a detail plan view of the retro-reflective target of FIG. 1.

Reflector 86 and its support means is illustrated in greater detail in FIG. 6. Here the end of arm 88 remote from reflector 86 is secured to a generally U-shaped member 94 by means of a pivot pin 95, the U-shaped member 94 being positioned within opposing ears 96, 97 standing uprightly from bracket 90. A pintle 98 is pierced through the opposing ends of member 94 and is secured in upstanding ears 96 and 97. The clearance of pintle 98 through the opposing ends of member 94 is sufficient to permit arm 88 to rock freely on the pintle, thus affording the reflector 86 a component of rocking motion through a generally horizontal plane.

Additionally, by virtue of the fact that arm 88 is secured to member 94 by pivot pin 95, this arm 88 is pivotable horizontally in a counterclockwise direction (viewing FIG. 6) about the pivot pin 95. In order to yieldingly hold arm 88 and reflector 86 in a position where the reflector provides a target for the light emitted from the photo-electric unit 94 a spring 102 is connected to arm 88 via pin 104, with the opposite end of spring 102 being secured to a fixed leg 106 extending from bracket 90. A locator screw 108 is threaded through a tab 110 projecting laterally from the end of arm 88 remote from reflector 86 with the interior end of the screw bearing on member 94. Consequently, upon reflector 86 or arm 88 engaging an object in the path of movement of tender 10 as the tender is propelled in the direction of arrow 80 the reflector and arm can yield both horizontally and vertically to displace the reflector from its operative location reflecting light transmitted from the photo-electric unit 84. In consequence thereof light is not reflected back to the receiver and the beam is effectively interrupted whereby the tender is halted in a manner to be more fully related hereinafter.

Spring 102 acts to return reflector 86 to its operative position when the object is disengaged from the reflector and locator screw 108 serves to accurately position the reflector in its operative location.

It has already been discussed that tender 10 is movable around the end of frame 12 on guideway or cross-bar 18. As an incident to such movement it may be desirable to retract reflector 86 and arm 88 from their extended operative positions so that these elements will not collide with adjacent equipment. Such retraction is accomplished by a hydraulically actuated two-way piston 111 slidable within a cylinder 112, best seen in FIG. 1. Cylinder 112 is affixed to wall 76 by a pin 113 which pivotally attaches one end on the cylinder to a bracket 114 with the cylinder depending toward arm 88. The lower end of piston 111 is similarly pivotally connected to a bracket 115 via stud 116 (FIG. 6). In turn, bracket 116 is secured to member 94. Thus when tender 10 approaches either end of frame 12 at a position beyond all of the spinning positions along the side of the frame it has just patrolled, suitable switching means (not shown) which may be an electrical switch at the end of the cross-bar 18 is actuated by the tender. The electrical switch energizes a solenoid control valve which gates on air to move piston 111 upwardly, thereby elevating arm 88 and reflector 86 to the position of FIG. 2. When tender 10 completes its movement around an end of frame 12 another switch (not shown) is actuated by tender 10 to deenergize the solenoid and thereby gate air to the opposite side of cylinder 112, returning arm 88 and reflector 86 to their operative, generally horizontal positions as shown in FIG. 1.

Figure 7:
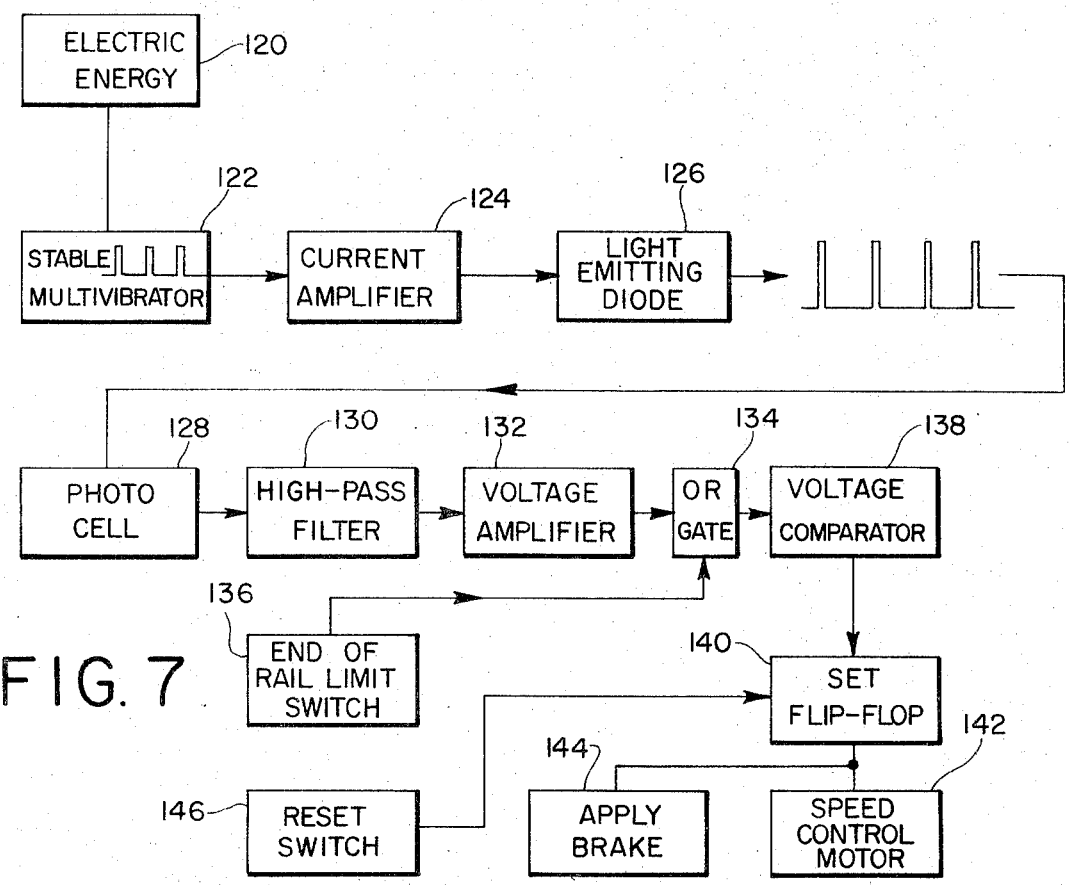
FIG. 7 is a block diagram of the control circuit of the present invention.

The circuit for operating the mechanisms for arresting the motion of the tender is illustrated in FIG. 7. The circuit includes a source of electric energy 120 which is applied to multivibrator 122. The output of multivibrator 122 is applied to an amplifier 124 and to a light emitting diode 126 housed within photo-electric unit 84. The output of light emitting diode 126 is radiant energy outside the visible spectrum modulated to provide a pulsed light beam of, say, .1 milliseconds duration at intervals of, say, 1 millisecond. Proper selection of the rate of modulation of the electrical energy output aids in filtering out ambients such as fluorescent light which may be present in the spinning frame environment. The radiant energy output from light emitting diode 126 is targeted at reflector 86 and returned as reflected light to photo cell 128 housed within photo-electric unit 84 along with light emitting diode 126. The input of photo cell 128 is applied to high-pass filter 130 and voltage amplifier 132. An OR gate 134 is connected in circuit with voltage amplifier 132 and an end of rail limit switch 136. A source of high level voltage is introduced into the circuit as tender 10 arrives at each end of frame 12, after having passed all of the spinning positions to be monitored along a side of spinning frame 12. As has been stated earlier, at each end of the frame it is desirable to inactivate the sensing unit by displacing reflector 86 and arm 88 from their active positions while tender 10 passes around the end of the frame. As long as the amplified voltage at OR gate 126 is high tender 10 is maintained in an operative driving state. Thus, if the voltage through amplifier 132 is maintained at a level indicative of the current incident on photo cell 128 from light emitting diode 126 the tender is maintained in an operative travelling state. Similarly, if the voltage level at OR gate 134 is maintained at this same level by voltage applied through the circuit by operation of the end of rail limit switch 136 the carriage is similarly maintained in an operative driving state. However, if the voltage applied at OR gate 134 drops below a predetermined value, indicative of the fact that the tender 10 is not at the end of the rail and that a voltage drop has occurred because of an interruption in the beam of light being reflected to photocell 128 voltage comparator 138 operates to set flip flop 140 to program speed control motor 142 of tender 10 to a zero state whereby the drive to tender 10 is removed. Speed control motor 142 may be a permanent magnet D.C. motor provided for four quadrant operation. Coincidentally with dropping the voltage input to speed control motor 142 to zero an electro-mechanical brake 144, in circuit with motor 142, is operated to brake tender 10 to a rapid stop. Reset of the mechanism is achieved through a manual reset switch 146 operating to reset flip flop 140.

Figure 5:
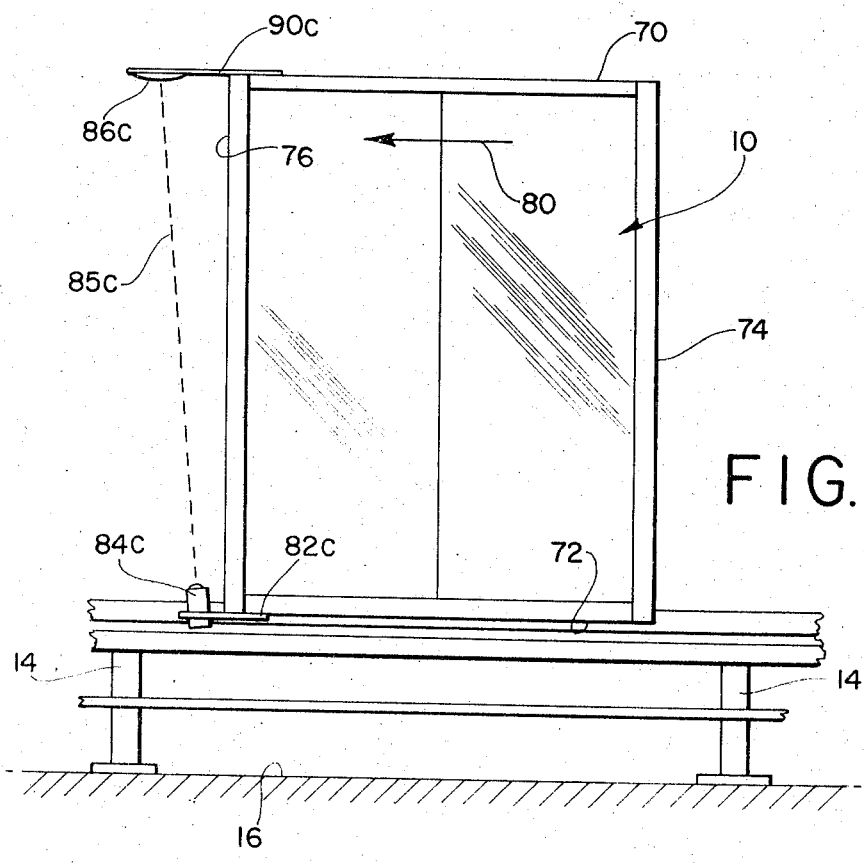

The present invention admits of several modifications which are depicted in FIGS. 3 through 5. Accordingly, in FIG. 3 photo-electric unit 84a is supported on a bracket 82a with reflective means such as retro-reflective tape 130 (the thickness of the tape being exaggerated in FIG. 3) being affixed on the floor or on a fixed member remote from and below the plane of tender 10.

In FIG. 4 a further modification is illustrated wherein a photo-electric unit 84b is supported on a bracket 82b affixed to the lower end of forward wall 76 with retro-reflective material such as retro-reflective tape 132 (the thickness of the tape being exaggerated in FIG. 4) being affixed to the overhead or other structure remote from and above the plane of traverse of tender 10.

In FIG. 5 another modification is illustrated wherein a photo-electric unit 84c mounted on a bracket 82c affixed to the lower end of forward wall 76 of tender 10. The upper end of forward wall 76 is provided with a bracket 90c which supports a reflector 86c for receiving the light emitted from the photo-electric unit and returning the light to radiant energy receiving means situated within the photo-electric unit 84c.

In all of the foregoing described modifications of FIGS. 3 through 5 it will be appreciated that the radiant energy is constituted as a light beam emitted into the path of travel of tender 10 and at an angle sufficient to be broken in the event the machine operator or any other object is situated forward of the tender the angle of the beam being such that upon interruption of the beam tender 10 can be halted prior to striking the object causing beam interruption, thereby precluding injury to the operator or other object.

From the foregoing it will be seen that a photo-electric control unit has been provided by this invention which is capable of emitting a single beam of light and illuminating a photo cell which is operable to control the voltage input to the driving motor of a traversing tender 10, the structure being operable to halt the traversal motion of the tender in the event that the beam is interrupted by a human or any other object in the path of the travelling tender.

Since certain changes may be made in the above apparatus without departing from the scope of the invention herein involved, it is intended that all matter contained in the above description or in the accompanying drawing shall be interrupted as illustrative only, and not in a limiting sense.

What is claimed is:

1. Apparatus for sensing the presence of an object in the path of a travelling mechanism movable by drive means over a fixed path into which objects or persons may enter comprising, a source of electrical energy, means in circuit with said electric energy to receive said energy and thereby provide an output signal modulated to produce a signal with modulation components different from ambient light conditions, radiant energy emitting means for receiving said signal and producing a radiation output beam from said signal, radiation sensitive means for receiving said modulated radiation output from said emitting source and transmitting a control signal derived therefrom and including said modulation components, filter means for detecting from said control signal the presence of said modulation components in said radiation output, drive control means sending said drive means to a zero speed state when the modulation components in said radiation output of said control signal drop below a predetermined value due to interruption of said beam, and movable reflection means mounted on said travelling mechanism to move therewith to form a radiant energy beam path between said emitting means and said radiation sensitive device, the reflection means being mounted so it is movable out of said beam path to interrupt said beam between said emitting means and the radiation sensitive device by encountering an object introduced in the travel path of said mechanism.

2. Apparatus for sensing the presence of an object in the path of a travelling mechanism movable by drive means over a fixed path into which objects or persons may enter comprising, a source of electrical energy, means in circuit with said electric energy to receive said energy and thereby provide an output signal modulated to produce a signal with modulation components different from ambient light conditions, radiant energy emitting means for receiving said signal and producing a radiation output beam from said signal, radiation sensitive means for receiving said modulated radiation output from said emitting source and transmitting a control signal derived therefrom and including said modulation components, filter means for detecting from said control signal the presence of said modulation components in said radiation output, drive control means sending said drive means to a zero speed state when the modulation components in said radiation output of said control signal drop below a predetermined value due to interruption of said beam wherein said machine includes an end portion about which said mechanism moves, said radiation output being precluded from transmission to said radiation sensitive means during movement of said mechanism about said end portion, and including switching means operable in response to said mechanism commencing movement about said end portion for applying a biasing signal to maintain the amplitude of said control signal above said predetermined value.

3. Apparatus as set forth in claim 2 including braking means for said mechanism, said drive control means being operable to energize said braking means to arrest the movement of said mechanism coincidently with programming said drive means to said zero state.

4. Apparatus as set forth in claim 3 wherein said mechanism inlcudes a forward wall facing the direction in which said mechanism moves, said forward wall having an upper section and a lower section vertically spaced from said upper section; said emitting means being mounted on said upper section in position to direct a beam of radiant energy in a path forward of said forward wall to illuminate said radiation sensitive means.

5. Apparatus as set forth in claim 4 including reflector means positioned on said mechanism generally in the plane of said lower section for transmitting the beam to said radiation sensitive means.

6. Apparatus as set forth in claim 4 including reflector means affixed in a position remote from said mechanism and below the plane of said lower section for transmitting the beam to the radiation sensitive means.

7. Apparatus as set forth in claim 3 wherein said mechanism includes a forward wall facing the direction in which said mechanism moves, said forward wall having an upper section and a lower section vertically spaced from said upper section; said emitting means being mounted on said lower section in position to direct said beam in a path forward of said forward wall to illuminate said radiation sensitive means.

8. Apparatus as set forth in claim 7 including reflector means positioned on said mechanism generally in the plane of said upper section for transmitting the beam to said radiation sensitive means.

9. Apparatus as set forth in claim 7 including reflector means affixed in a position remote from said mechanism and above the plane of said upper section for transmitting the beam to the radiation sensitive means.

* * * * *